United States Patent
Birnbrich et al.

(10) Patent No.: US 6,639,001 B1
(45) Date of Patent: Oct. 28, 2003

(54) METHODS OF PREPARING POLYOLEFIN-BASED MATERIALS HAVING IMPROVED ADHESIVE/COATING COMPATIBILITY

(75) Inventors: Paul Birnbrich, Solingen (DE); Joerg-Dieter Klamann, Bremerhaven (DE); Rolf Tenhaef, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/831,510

(22) PCT Filed: Oct. 30, 1999

(86) PCT No.: PCT/EP99/08291

§ 371 (c)(1),
(2), (4) Date: Aug. 21, 2001

(87) PCT Pub. No.: WO00/29475

PCT Pub. Date: May 25, 2000

(30) Foreign Application Priority Data

Nov. 10, 1998 (DE) .......................................... 198 51 689

(51) Int. Cl.$^7$ ................................................. C08K 3/08
(52) U.S. Cl. ..................... 524/413; 524/406; 524/407; 524/408
(58) Field of Search ............................... 524/413, 406, 524/407, 408

(56) References Cited

U.S. PATENT DOCUMENTS

| | | | | |
|---|---|---|---|---|
| 5,512,370 A | * | 4/1996 | Edwards | 428/373 |
| 5,589,519 A | * | 12/1996 | Knaus | 521/60 |
| 6,013,723 A | * | 1/2000 | Akao | 524/577 |
| 6,107,406 A | | 8/2000 | Birnbrich et al. | |

FOREIGN PATENT DOCUMENTS

| | | |
|---|---|---|
| DE | 195 36 961 A1 | 4/1997 |
| DE | 197 12 380 A1 | 10/1998 |
| EP | 0 248 771 A2 | 12/1987 |
| EP | 0 372 890 B1 | 6/1990 |
| EP | 0 567 058 A2 | 10/1993 |
| EP | 0 616 622 B1 | 9/1994 |
| GB | 2 075 030 A | 11/1981 |
| WO | WO 97/12694 | 4/1997 |
| WO | WO 98/42776 | 10/1998 |

OTHER PUBLICATIONS

Stoeckhert (Editor), "Veredeln von Kunststoff–Oberflächen", Carl Hanser Verlag, Munich, 1974, pp. 136–137.

Neumüller, "Römpps Chemie–Lexikon", Stuttgart, 1977, pp. 3717–3719.

* cited by examiner

Primary Examiner—Edward J. Cain
(74) Attorney, Agent, or Firm—John E. Drach; Aaron R. Ettelman

(57) ABSTRACT

Methods of preparing polyolefin-based molded materials with improved adhesive/coating compatibility by incorporating saturated fatty acid amides and transition metal compounds in the polyolefin-based material prior to molding are described. Methods of producing coated or bonded polyolefin-based, molded materials are also described.

22 Claims, No Drawings

METHODS OF PREPARING POLYOLEFIN-BASED MATERIALS HAVING IMPROVED ADHESIVE/COATING COMPATIBILITY

BACKGROUND OF THE INVENTION

Molded workpieces of any three-dimensional form, including polyolefin-based moldings, fibers and films, are used on a very wide scale in practice. An important problem area here is improving the surface properties of these structurally nonpolar hydrocarbon components. Thus, the poor adhesion of coatings and adhesives is a central problem which has remained unsolved for decades despite numerous attempts to find a solution.

It is known from the prior art that the compatibility of plastic surfaces with coatings and adhesives can be improved, for example, by oxidative aftertreatment processes, such as corona or plasma treatment. In processes such as these, the surface of the plastic is oxidized or chemically modified in the presence of gases and discharges, so that certain surface properties of the plastic can be modified. However, apart from their high energy consumption, processes such as these always involve an additional step and lead to ozone emissions in the manufacture of plastic parts. In addition, chemical pretreatment processes, including for example treatment with fluorine or chlorine gas, with chromosulfuric acid or fluorosulfonic acid, etc., have also been known for some time.

EP-B-372 890 describes polyolefin- or polyester-based fibers with a lubricant adhesively applied to their surface. This lubricant comprises a mixture of (1) fatty acid diethanolamide, (2) a polyether-modified silicone, (3) a sorbitan fatty acid ester and (4) a metal salt of an alkyl sulfonate. Components (1) to (4) are present in special quantity ratios. According to page 3, lines 20 to 26, the mixture of components (1) to (4) is applied to the surface. The technique by which the mixture containing the four components is applied to the surface of fibers is described in detail on page 4, lines 6 to 9. The application techniques mentioned include a) the use of rollers, b) spraying and c) immersion. Accordingly, the process according to EP-B-372 890 is a process in which a mixture of components (1) to (4) is applied to the surface of polyolefin moldings in an additional process step. Accordingly, the expression "adhesively applied to the fiber surface" used in claim 1 of EP-B-372 890 may be clearly interpreted by the expert to mean that any adhesion involved is loose and temporary, for example in the form of relatively weak adhesion forces, and cannot in any way to be considered to represent permanent anchorage.

In view of the very widely used traditional chemical aftertreatment processes, such as corona and plasma treatment, it is known to the expert that no exact statements can be made as to the various processes involved. However, it has been established that oxidative surface changes occur and result in the formation of certain "active centers". Unfortunately, their concentration generally decreases with time so that the pretreatment effect also is only in evidence for a certain time, generally not more than 72 hours (cf. for example, Klaus Stoeckert (Editor), "Veredeln von Kunststoff-Oberflächen", Munich 1974, page 137).

One feature common to all the known processes is that, in general, the desired surface effects are only temporarily present.

EP-B-616 622 relates to extrudable compostable polymer compositions comprising an extrudable thermoplastic polymer, copolymer or mixtures thereof containing a degradation-promoting system of an auto-oxidative component and a transition metal. The auto-oxidative system comprises a fatty acid, a substituted fatty acid or derivatives or mixtures thereof, the fatty acid having 10 to 22 carbon atoms and containing at least 0.1% by weight of unsaturated compounds and at least 0.1% by weight of free acid. The transition metal is present in the composition in the form of a salt in a quantity of 5 to 500 ppm and is selected from the group consisting of cobalt, manganese, copper, cerium, vanadium and iron. In the form of a film around 100 microns thick, the composition is said to be oxidatively degradable to a brittle material over a period of 14 days at 60° C. and at a relative air humidity of at least 80%.

WO 97/12694 and WO 98/42776 describe the use of amphiphiles for permanently improving the adhesive and/or coating compatibility of polyolefin-based moldings, fibers and films in which a mixture containing (a) predominantly one or more polyolefins, (b) one or more migratable amphiphiles and (c) of one or more transition metal compounds is subjected in the usual way to molding, for example by extrusion, at temperatures in the range from 180 to 320° C. It is disclosed that dialkanolamides of unsaturated fatty acids, for example oleic acid diethanolamide or linoleic acid diethanolamide, are particularly suitable for use as component (b). So far as the nature of component (c) is concerned, WO 97/12694 makes particular mention of Co, Zr, Fe, Pb, Mn, Ni, Cr, V and Ce while WO 98/42776 refers in particular to Ti and Sn as the transition metal present in that component.

BRIEF SUMMARY OF THE INVENTION

The present invention relates, in general, to methods of permanently improving the adhesive and/or coating compatibility of polyolefin-based moldings, fibers and films with the use of fatty acid amides.

The problem addressed by the present invention was to provide auxiliaries with which the adhesive and/or coating compatibility of polyolefin-based moldings, fibers and films could be lastingly and permanently improved. In other words, the object of the invention was to provide auxiliaries for permanently improving the affinity of polyolefin surfaces for adhesives and/or coatings. More particularly, the object of invention was to make it possible to establish high-strength bonds which would rule out unwanted adhesive failures and would ensure that the adhesive joint could only be destroyed by cohesive failure or by combined cohesive/adhesive failure. In particular, the effectiveness of the amphiphiles known from the prior art in permanently improving the adhesive and/or coating compatibility of polyolefin-based moldings, fibers and films would be quantitatively improved.

The present invention relates to the use of fatty acid amides for permanently improving the adhesive and/or coating compatibility of polyolefin-based moldings, fibers and films, a mixture containing a) predominantly one or more polyolefins,
b) 0.01 to 20% by weight—based on the polyolefins—of one or more fatty acid amides and
c) 0.01 to 1000 ppm of one or more transition metal compounds—metal content of the transition metal compounds, based on the polyolefins—being subjected in known manner to molding by extrusion, calendering, injection molding, blow molding and the like at temperatures of 180 to 330° C., with the proviso that the fatty acid amides b) are selected from the class of compounds corresponding to general formula (I):

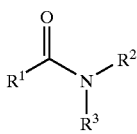

(I)

in which $R^1$ is a saturated alkyl group containing 5 to 21 carbon atoms, $R^2$ and $R^3$ independently of one another are hydrogen or alkyl groups containing 1 to 18 carbon atoms which may each be substituted by up to 6 OH groups, $NH_2$ groups or $C_{1-10}$ alkyl groups and in which up to three ethylene groups which are not immediately adjacent one another may be replaced by oxygen, with the proviso that $R^1$ and $R^2$ cannot both be hydrogen and the additional proviso that the mixture containing components a), b) and c) contains fatty acid amides based on unsaturated fatty acids at most in a quantity which corresponds to 40% by weight, based on the quantity of fatty acid amides b) based on saturated fatty acids.

"Transition metals" in the context of the present invention are any transition metals in the narrower sense (cf. for example Römpps Chemie-Lexikon, Stuttgart 1977, pp. 3717) and, in addition, the metals tin (Sn) and lead (Pb).

The fatty acid amides b) of general formula (I) to be used in accordance with the invention are derived from $C_{6-22}$ fatty acids. These fatty acids are characterized by the general formula (II) $R^1$—COOH, in which $R^1$ is as defined above.

DETAILED DESCRIPTION OF THE INVENTION

In one embodiment, the fatty acid amides b) are fatty acid alkanolamides or dialkanolamides, the fatty acid on which these compounds are based being saturated $C_{6-22}$ fatty acids.

The fatty acid alkanolamides are compounds corresponding to general formula (Ia):

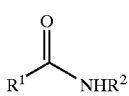

(Ia)

in which $R^1$ is as defined above and $R^2$ is a $C_{1-18}$ alkyl group that may be substituted by up to 6 OH groups, $NH_2$ groups or $C_{1-10}$ alkyl groups. $R^2$ is preferably a $C_{1-6}$ alkyl group substituted by an OH group.

The fatty acid dialkanolamides are compounds corresponding to general formula (Ib):

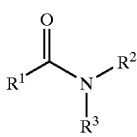

(Ib)

in which $R^1$ is as defined above and $R^2$ and $R^3$ independently of one another are $C_{1-18}$ alkyl groups that may be substituted by up to 6 OH groups, $NH_2$ groups or $C_{1-10}$ alkyl groups. $R^2$ and $R^3$ are preferably $C_{1-6}$ alkyl groups substituted by an OH group.

The compounds b) may be used both individually and in combination with one another.

In a preferred embodiment, the compounds b) used are those of which the basic fatty acids are saturated fatty acids containing 12 to 16 and more particularly 12 to 14 carbon atoms. Particularly preferred compounds of this class are the mono- and di-ethanolamides of lauric acid, myristic acid and mixtures of these acids occurring in vegetable raw materials, for example coconut fatty acid. The compounds mentioned are used in particular in technical quality.

Another embodiment is characterized by the additional proviso that the mixture containing components a), b) and c) contains fatty acid amides based on unsaturated fatty acids in at most a quantity which corresponds to 10% by weight, based on the quantity of fatty acid amides b) based on saturated fatty acids.

The compounds b) to be used in accordance with the invention are capable of migration. This means that these compounds are capable of moving during production, for example by extrusion, to the surface of the resulting polyolefin molding. Accordingly, they accumulate at the surface of the plastic matrix or in zones near its surface which Applicants were able to verify by successive removal of surface layers of the order of a few nanometers in thickness and subsequent application of Abscan techniques.

The use of the special fatty acid amides b) mentioned in accordance with the invention ensures that coatings and adhesives are able to adhere to the plastic permanently and without additional pretreatment. Once established, adhesive and/or coating compatibility values remain intact for long periods or sometimes even increase in the event of continued storage. According to the invention, there are basically no restrictions as to the type of adhesives and coating compositions which can be brought into contact with the polyolefins surface-modified in accordance with the invention so that permanent bonding or coating is achieved. Thus, any adhesives known to the expert, especially commercially available adhesives, may be used as the adhesives. So far as coatings are concerned, paints are particularly relevant. Paints are liquids or powder-form solids which are applied in thin layers to surfaces and which form a strong decorative and/or protective film on those surfaces by chemical reaction and/or physical processes. Coatings in the context of the invention also include printing inks because printing inks are applied to substrates to be printed in a binder layer, adhesion to the substrate being imparted by the binder which forms a coating.

The mixture containing components a), b) and c) is used in traditional molding techniques well-known to the expert, such as extrusion, calendering, injection molding, blow molding and the like. In a preferred embodiment of the present invention, the melt of the mixture containing components a), b) and c) comes into contact with oxygen, more especially atmospheric oxygen, in the course of the molding process. In the case of extrusion, for example, this happens when the melt leaves the extruder through the extrusion die. The preferred embodiment mentioned above enables oxidative—optionally catalytically assisted—processes and other secondary reactions to take place. (Atmospheric) oxygen can act on the one hand on the surface itself and, on the other hand, even in the interior of the plastic—especially in zones near the surface—to which it is capable of diffusing.

The combination of the teaching according to the invention which leads to high adhesive or coating compatibility values with technologies known per se for improving coating or adhesive compatibility on polyolefin surfaces falls within the scope of the teaching according to the invention. Thus, the surfaces of the polyolefins produced in accordance with the invention may also be both mechanically and chemically and/or physically treated. However, this is generally not necessary.

As already mentioned, the compounds b) are used in combination with transition metal compounds c) during the molding of the polyolefins a). The quantity of transition metal compound—metal content of the transition metal compound based on the polyolefins—is in the range from 0.01 to 1000 ppm. Basically, there are no particular restrictions as to the nature of the transition metal compounds. In principle, therefore, any transition metal compounds known to the expert may be used for the purposes of the teaching according to the invention. In one embodiment, transition metal salts, preferably salts based on organic acids containing 6 to 22 carbon atoms, are used as the transition metal compounds. In another embodiment, the transition metal compounds are used in a quantity below 5 ppm—metal content of the transition metal compound based on the polyolefins. Another embodiment is characterized by the use of transition metal compounds c) of which the metals are selected from the group consisting of Co, Zr, Fe, Pb, Mn, Ni, Cr, V, Ce, Ti and Sn.

If desired, other compounds known to the expert as catalysts for oxidative processes may be used in addition to the compulsory transition metal compounds mentioned.

In one preferred embodiment, the ratio by weight of the compounds b) to the metal content of the transition metal compounds c) is adjusted to a value of 10:0.1 to $10:10^{-7}$, preferably to a value of 10:0.02 to $10:10^{-6}$ and more preferably to a value of 10:0.01 to $10:10^{-5}$.

According to the invention, the special fatty acid amides b) are used in the course of routine molding processes, such as extrusion, calendering, injection molding, blow molding and the like. It may be desirable to use components a), b) and c) in the form of a mixture prepared in advance. Other typical auxiliaries which have generally been successful in the molding of plastics and which are known to the expert, for example slip agents, antistatic agents, lubricants, release agents, UV stabilizers, antioxidants, fillers, fire retardants, mold release agents, nucleating agents and antiblocking agents, may also be separately made up and added during the final mixing of the end products. The common practice of using the auxiliaries mentioned in a form in which they are already completely or partly present in component a) is also expressly included within the scope of the present invention.

However, it may also be desirable, for example where extrusion is applied, to introduce components b) and/or c) and/or other additives either completely or partly into the polyolefin melt itself in the extruder, so that the mixture of components a), b) and c)—and optionally other auxiliaries—is not present from the outset as a made-up product, but is formed in the extruder itself. A technique such as this is appropriate, for example, when the compounds b) to be added to the polymer melt are present in liquid form and are easier to inject than to make up in advance.

It may even be desirable, although not necessary for obtaining the effect according to the invention, to undertake a conventional corona or plasma treatment after the use of components a) to c) in accordance with the invention.

Basically, any known ethylene- or propylene-based polymers and copolymers may be used as the basic oleophilic polyolefin material.

Mixtures of pure polyolefins with copolymers are also suitable in principle providing the compounds b) retain their ability to migrate in accordance with the invention and hence to collect at the surfaces of solids. Polymers particularly suitable for the purposes of the teaching according to the invention are listed below: poly(ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); isotactic polypropylene; syndiotactic polypropylene; Metallocen-catalyzed polypropylene, high-impact polypropylene, random copolymers based on ethylene and propylene, block copolymers based on ethylene and propylene; EPM (poly[ethylene-co-propylene]); EPDM (poly[ethylene-co-propylene-co-unconjugated diene]).

Other suitable polymers are: poly(styrene); poly(methylstyrene); poly(oxymethylene); Metallocen-catalyzed α-olefin or cycloolefin copolymers, such as norbornene/ethylene copolymers; copolymers containing at least 80% ethylene and/or styrene and less than 20% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly(ethylene-co-vinyl chloride), poly(styrene-co-acrylonitrile). Also suitable are graft copolymers and polymer blends, i.e. mixtures of polymers in which the abovementioned polymers inter alia are present, for example polymer blends based on polyethylene and polypropylene.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

The application of coatings or adhesives to the surface-modified polyolefin-based moldings and films obtained by the process according to the invention may basically be carried out by any of the relevant methods known to the expert.

In one embodiment, polyethylene is used as component a). If it is HDPE (high-density polyethylene), a temperature of 200 to 300° C. is preferably adjusted during molding whereas, in the case of HDPE containing carbon black, the molding temperature is preferably adjusted to a value in the range from 250 to 300° C. If LDPE (low-density polyethylene) is used, a temperature of 180 to 260° C. and more particularly in the range from 200 to 260° C. is preferably adjusted during the molding process.

In the case of extrusion processes, the temperatures just mentioned for HDPE and LDPE apply in particular to the temperature of the die.

If the mixture of components a), b) and c) is molded by extrusion, the polyolefin molding is cooled by at most 50° C., preferably in 0.1 to 5.0 seconds, immediately after leaving the die. Accordingly, this temperature difference of 50° C.—hereinafter also referred to as ΔT50—is governed by the following equation:

$$\Delta T50 = T_{die} - T_{polyolefin\ surface}$$

where $T_{die}$ is the temperature of the extrusion die while $T_{polyolefin\ surface}$ is the surface temperature of the extruded polyolefin molding as measured without any contact, for example using relevant known infrared techniques (for example with a Chino "IR-TA/Handy 1000" infrared thermometer).

In one particularly preferred embodiment, the polyolefin molding is cooled by at most 50° C. in 1.0 to 5.0 seconds and more particularly in 1.7 to 5.0 seconds immediately after leaving the extrusion die.

Assuming that the polyolefin molding moves at a constant speed after leaving the extrusion die, the time scale mentioned can easily be converted into a distance scale using the known equation v=s/t (speed=distance divided by time) which can be transformed to s=v*t (distance=speed multiplied by time) from which it can be seen that distance s (i.e. distance from the extrusion die) and time t are proportional to one another. By definition, the zero point of the distance scale is situated immediately at the exit point of the die.

The polyolefin moldings obtainable using the fatty acid amides b), more particularly the granules obtainable by extrusion, may be used as so-called master batches in the processing of bulk plastics.

The present invention also relates to a process for the production of bonded and/or coated polyolefin-based moldings, fibers and films, in which a mixture containing a) predominantly one or more polyolefins, b) 0.01 to 20% by weight—based on the polyolefins—of one or more fatty acid amides and c) 0.01 to 1000 ppm of one or more transition metal compounds—metal content of the transition metal compounds, based on the polyolefins—is subjected in known manner to molding by extrusion, calendering, injection molding, blow molding and the like at temperatures of 180 to 330° C. and the resulting polyolefin-based moldings, fibers and films with improved adhesive and/or coating compatibility are subsequently contacted in the usual way with an adhesive and/or a coating composition, characterized in that the fatty acid amides b) are selected from the class of compounds corresponding to general formula (I):

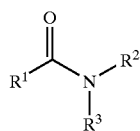
(I)

in which $R^1$ is a saturated alkyl group containing 5 to 21 carbon atoms, $R^2$ and $R^3$ independently of one another are hydrogen or alkyl groups containing 1 to 18 carbon atoms which may each be substituted by up to 6 OH groups, $NH_2$ groups or $C_{1-10}$ alkyl groups and in which up to three methylene groups which are not immediately adjacent one another may be replaced by oxygen, with the proviso that $R^1$ and $R^2$ cannot both be hydrogen and the additional proviso that the mixture containing components a), b) and c) contains fatty acid amides based on unsaturated fatty acids at most in a quantity which corresponds to 40% by weight, based on the quantity of fatty acid amides b) based on saturated fatty acids.

EXAMPLES

1. Materials Used 1.1. Polyolefins (a)

Hosta: high-density polyethylene ("Hostalen CRP 100", a product of Hostalen GmbH); according to the manufacturer, this polyethylene also contains antioxidants and carbon black Lupo: low-density polyethylene ("Lupolen 1800 H", a product of Elenac)

1.2. Additives (b)

Comperlan LD: lauric acid diethanolamide (product of Henkel KGaA, Düsseldorf)

Comperlan LM: lauric acid monoethanolamide (product of Henkel KGaA, Düsseldorf)

Comperlan F: linoleic acid diethanolamide (product of Henkel KGaA, Düsseldorf)

C8-AE: reaction product of methyl caprylate and 2-(2-aminoethoxy)-ethanol (obtained by the general procedure for preparing amides described below) C12-AE: reaction product of methyl laurate and 2-(2-aminoethoxy)-ethanol (obtained by the general procedure for preparing amides described below)

C16-AE: reaction product of methyl palmitate with 2-(2-aminoethoxy)-ethanol (obtained by the general procedure for preparing amides described below)

C8-APD: reaction product of methyl caprylate and 3-aminopropane-1,2-diol (obtained by the general procedure for preparing amides described below)

C12-APD: reaction product of methyl laurate and 3-aminopropane-1,2-diol (obtained by the general procedure for preparing amides described below)

C16-APD: reaction product of methyl palmitate and 3-aminopropane-1,2-diol (obtained by the general procedure for preparing amides described below)

C12-EA: reaction product of methyl laurate and ethanolamine (obtained by the general procedure for preparing amides described below)

C12-AP: reaction product of methyl laurate and 3-amino-1-propanol (obtained by the general procedure for preparing amides described below)

C12-MPMD: reaction product of methyl laurate and 2-methyl pentamethylenediamine (obtained by the general procedure for preparing amides described below)

C12-BEPD: reaction product of lauric acid methyl ester and 2-butyl-2-ethylpentane-1,5-diamine (obtained by the general procedure for preparing amides described below)

C18-DEA: stearic acid diethanolamide.

General Procedure for Preparing Amides 1 mole fatty acid methyl ester and 1 mole amine were introduced into a 500 ml flask equipped with a stirrer, dropping funnel and internal thermometer. The amine was quickly added dropwise with stirring in an inert gas atmosphere (nitrogen). 7.2 g of a 30% by weight solution of sodium methylate in methanol were then added and the reaction mixture was slowly heated to a bottom temperature of 120° C. The reaction mixture was then stirred at that temperature for 4 hours. Methanol was then continuously distilled off in a water jet vacuum at a bottom temperature of 180° C.

The following compounds b) were prepared by this procedure: C8-AE, C12-AE, C16-AE, C8-APD, C12-APD, C16-APD, C12-EA, C12-AP, C12-MPMP, C12-BEPD.

1.3. Transition metal compounds c)

The metals of the transition metal compounds c) used all had the oxidation number +2. Fe, Mn, Zr and Ce were used in the form of their octoates or nitrates. Co and Cu were used in the form of "Octa-Soligen Kobalt 6 in D60" and "Soligen Kupfer 8" (products of Borchers); these products are referred to in Tables 1 to 3 as Co-Soligen and Cu-Soligen, respectively.

2. Production of Surface-modified Polyethylene by the Process According to the Invention In order to test the adhesive compatibility properties of surface-modified polyethylene, polyethylene was initially produced in tape form by mixing 600 g of polyethylene granules a) (the particular type of polyethylene used is shown in Tables 1 to 3), additive b) and transition metal compound c).

The particular type and quantity of components b) and c) used are shown in Tables 1 to 3. The mixtures were introduced through a hopper into an extruder. A Brabender DSK 42/7 twin-screw extruder (Brabender OHG, Duisburg) was used. As well-known to the expert, an extruder is a machine for processing plastics in which both powder-form and granular thermoplastics can be continuously mixed and plasticized. Beneath the feed hopper, there is a contra-rotating twin screw longitudinally divided into three heating zones in addition to a water-cooling system which is intended to prevent premature melting of the granules or powder. The temperature of the heating zones and the rotational speed of the twin screw can be controlled through a data-processing Plast-Corder PL 2000 which is connected to the extruded via a PC interface. To produce the polyethylene tapes, the following temperatures were adjusted: heating zones I–III all 230° C., the three heating zones being air-cooled to keep the temperatures constant.

The polyethylene granules (including the particular components b) and c) were automatically taken into the extruder by the contra-rotating twin screw and transported along the screw. The rotational speed was 50 r.p.m. This guaranteed a relatively long residence time in the extruder and hence thorough compounding and homogenization. The resulting homogeneous and substantially bubble-free mixture finally entered a die which represents a fourth heating zone. The temperature of the die was varied in the individual tests and is shown in Tables 1 to 3.

After leaving the die, the hot mixture flowed onto a conveyor belt of which the speed was adjusted so that a smooth and uniformly thick and wide tape was formed on cooling in air. In the tests described here, the speed was adjusted so that the polyethylene tape was about 35 mm wide and about 0.35 mm thick. Square test specimens (25×25 mm) were die-cut from this material and used for the bonding tests described hereinafter.

3. Adhesion and Tensile Tests
3.1. Production of the Test Specimens

The extruded tapes produced in accordance with 2) were stored for 24 hours at room temperature (20° C.). Square 25×25 mm pieces of polyethylene were then bonded between two 100×25 mm strips of wood. The bond had a thickness of 2 mm. The area bonded measured exactly 25×25=625 mm$^2$. It is pointed out that the test arrangement corresponds to that schematized on page 21 of the above-cited WO 98/42776 (except that the pieces of polypropylene was replaced by pieces of polyethylene).

A two-component adhesive ("Makroplast" polyurethane adhesive, a product of Henkel KGaA, Düsseldorf) was used as the adhesive. The two reactive components (resin=UK 8109; hardener=UK 5400) were stirred in a ratio of 5:1 in an aluminium dish. The pot life was about 1 hour.

After storage for about 1 hour, 25 mm wide strips were cut off from each tape and, with the aid of a template, were bonded on both sides between two strips of wood. Five strips of each plastic tape were bonded. The use of a template ensures that the required surface to be bonded is kept to between the modified plastic and the strips of wood. Wooden clamps were used to fix the test specimen. Surplus adhesive was removed.

3.2. Tensile Tests

The test specimens produced in accordance with 3.1.) were stored for about 3 to 4 days at 20° C. to ensure that the two-component adhesive was fully cured. A Zwick universal testing machine was used to measure the tensile shear forces. The rate at which the test specimen was placed under tensile load was 15 mm/min. The bonded wood spatulas (=test specimens) were clamped in the clamping jaws of the universal testing machine and pulled apart at the designated test rate. Care was taken to ensure that the test specimens were always arranged vertically and exactly in the middle of the testing machine. The test results obtained are set out in Tables 1 to 3. All the results are averages of 5 tests.

Explanation of Column Headings of Tables 1–3:

No. test number (B=invention; C=comparison)
  a) component a) (polyolefin)
  b) component b) (or—in comparison tests—an additive); the "%" column shows the quantity in which the particular compound—% by weight, based on component a)—was used
  c) component c); the "ppm Me" column shows the quantity in ppm (parts per million) in which the transition metal of the transition metal compound—based on component a)—was used T/die: die temperature in ° C.

TSS: tensile shear strength as determined in the tensile tests and expressed in newtons/mm$^2$

TABLE 1

| | b) | | c) | | T/die | |
|---|---|---|---|---|---|---|
| No. | a) | % Compound | ppm Me | Compound | ° C. | TSS |
| B1 | Lupo | 1.0 Comperlan LD | 6 | Co-Soligen | 220 | 2.67 |
| C1 | Lupo | 1.0 Comperlan F | 6 | Co-Soligen | 220 | 0.52 |
| B2 | Lupo | 1.0 Comperlan LD | 6 | Co-Soligen | 230 | 4.24 |
| C2 | Lupo | 1.0 Comperlan F | 6 | Co-Soligen | 230 | 0.58 |
| B3 | Lupo | 1.0 Comperlan LD | 6 | Co-Soligen | 240 | 4.85 |
| C3 | Lupo | 1.0 Comperlan F | 6 | Co-Soligen | 240 | 2.28 |
| B4 | Lupo | 0.1 Comperlan LD | 6 | Co-Soligen | 250 | 2.29 |
| C4 | Lupo | 0.1 Comperlan F | 6 | Co-Soligen | 250 | 0.4 |
| B5 | Lupo | 0.3 Comperlan LD | 6 | Co-Soligen | 250 | 3.87 |
| C5 | Lupo | 0.3 Comperlan F | 6 | Co-Soligen | 250 | 1.33 |
| C6 | Lupo | — — | 6 | | 250 | 0.20 |

It can be seen from Table 1 that the results obtained where the fatty acid amides according to the invention (cf. Examples B1 to B5) based on saturated fatty acids—demonstrated here by the example of Comperlan LD—are used are distinctly better than those obtained where fatty acid amides based on unsaturated fatty acids—demonstrated here by the example of Comperlan F—are used (cf. Comparison Examples C1 to C5).

TABLE 2

| | b) | | c) | | T/die | |
|---|---|---|---|---|---|---|
| No. | a) | % Compound | ppm Me | Compound | ° C. | TSS |
| B6 | Lupo | 1.0 Comperlan LD | 6 | Co-Soligen | 220 | 2.43 |
| B7 | Lupo | 1.0 Comperlan LD | 6 | Co-Soligen | 230 | 3.31 |
| B8 | Lupo | 1.0 Comperlan LD | 6 | Co-Soligen | 240 | 5.47 |
| B9 | Lupo | 1.0 Comperlan LD | 6 | Co-Soligen | 250 | 5.67 |
| B10 | Lupo | 1.0 Comperlan LD | 6 | Co-Soligen | 260 | 6.10 |
| B11 | Hosta | 1.0 Comperlan LD | 6 | Co-Soligen | 280 | 3.45 |
| B12 | Hosta | 0.1 Comperlan LD | 6 | Co-Soligen | 290 | 4.81 |
| B13 | Hosta | 1.0 Comperlan LD | 6 | Co-Soligen | 300 | 4.10 |

Table 2 demonstrates that the optimum temperature of the extrusion die depends on whether the polyethylene used is of the HDPE type or the LDPE type.

TABLE 3

| No. | a) | b) % Compound | c) ppm Me | Compound | T/die °C. | TSS |
|---|---|---|---|---|---|---|
| B14 | Lupo | 1.5 C8-AE | 6 | Co-Soligen | 230 | 4.05 |
| B15 | Lupo | 1.5 C12-AE | 6 | Co-Soligen | 230 | 2.95 |
| B16 | Lupo | 1.5 C12/14-AE | 6 | Co-Soligen | 230 | 4.51 |
| B17 | Lupo | 1.5 C8-APD | 6 | Co-Soligen | 230 | 2.38 |
| B18 | Lupo | 1.5 C12-APD | 6 | Co-Soligen | 230 | 3.98 |
| B19 | Lupo | 1.5 C12/14-APD | 6 | Co-Soligen | 230 | 4.51 |
| B20 | Lupo | 1.5 C12-EA | 6 | Co-Soligen | 230 | 3.52 |
| B21 | Lupo | 1.5 C12-AP | 6 | Co-Soligen | 230 | 2.85 |
| B22 | Lupo | 1.5 C12-MPMD | 6 | Co-Soligen | 230 | 3.85 |
| B23 | Lupo | 1.5 C12-BEPD | 6 | Co-Soligen | 230 | 3.78 |
| B24 | Lupo | 1.0 Comperlan LM | 6 | Co-Soligen | 230 | 3.52 |
| B25 | Lupo | 1.0 Comperlan LD | 6 | Fe octoate | 250 | 4.66 |
| B26 | Lupo | 1.0 Comperlan LD | 6 | Mn octoate | 250 | 5.56 |
| B27 | Lupo | 1.0 Comperlan LD | 6 | Zr octoate | 250 | 4.12 |
| B28 | Lupo | 1.0 Comperlan LD | 6 | Ce octoate | 250 | 4.81 |
| B29 | Lupo | 1.0 Comperlan LD | 6 | Cu-Soligen | 250 | 4.60 |
| B30 | Lupo | 1.0 Comperlan LD | 6 | Co-Soligen | 250 | 6.77 |
| B31 | Lupo | 1.0 C18-DEA | 6 | Co/Zr octoate | 250 | 5.21 |
| B32 | Lupo | 1.0 Comperlan LD | 3 | Co nitrate | 250 | 4.81 |
| B33 | Lupo | 1.0 Comperlan LD | 4.5 | Co nitrate | 250 | 5.47 |

Further tests conducted by Applicants have shown that TSS values of the same excellent order as shown in Tables 1 to 3 are obtained where transition metal compounds or transition metal salts containing the same metals but other ligands or counterions are used as component c).

In addition, other tests conducted by Applicants have revealed that TSS values of the same excellent order as shown in Tables 1 to 3 are obtained when the adhesion and tensile tests are varied by using other commercially available adhesives than the polyurethane adhesive "Makroplast" in the production of the test specimens. The following adhesives, for example, have been tested with excellent results: Sicomet 7000, Sicomet 8400, Sicomet 9010, Sicomet thixotrop (cyanoacrylates); Pattex Montage, Ponal Duo, Teromix 6700 (two-component polyurethane adhesives); Terorehm MC 9340 (hotmelt polyurethane adhesive); Metallon RA, Metallon FL, Pattex Kraft Mix (two-component epoxy adhesives).

What is claim is:

1. A method of preparing molded polyolefin-based materials with improved adhesive/coating compatibility, said method comprising:
   (a) providing a polyolefin-based material to be molded, said material comprising one or more polyolefins, from 0.01 to 20% by weight of a saturated fatty acid amide, based upon a total weight of the one or more polyolefins, and a transition metal compound in an amount of from 0.01 to 1000 ppm metal based on the one or more polyolefins; and
   (b) subjecting the polyolefin-based material to a molding procedure;
   wherein the saturated fatty acid amide corresponds to general formula (I):

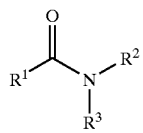

(I)

wherein $R^1$ represents a saturated alkyl group having from 5 to 21 carbon atoms; wherein $R^2$ and $R^3$ each independently represents hydrogen or an alkyl group having from 1 to 18 carbon atoms, the alkyl group having up to six substituents selected from the group consisting of OH groups, $NH_2$ groups, and $C_{1-10}$ alkyl groups, and wherein up to three non-adjacent carbon atoms in the alkyl group have been substituted with oxygen ether linkages; with the proviso that not both of $R^2$ and $R^3$ are hydrogen;
   and wherein the polyolefin-based material contains unsaturated fatty acid amides in an amount not greater than 40% by weight based on the saturated fatty acid amide.

2. The method according to claim 1, wherein the one or more polyolefins is selected from the group consisting of polyethylenes, polypropylenes, and polyethylene/polypropylene copolymers.

3. The method according to claim 1, wherein the one or more polyolefins comprises a polyethylene.

4. The method according to claim 1, wherein at least one of $R^2$ and $R^3$ represents an alkyl group having from 1 to 6 carbon atoms with at least one OH group substituent.

5. The method according to claim 3, wherein at least one of $R^2$ and $R^3$ represents an alkyl group having from 1 to 6 carbon atoms with at least one OH group substituent.

6. The method according to claim 1, wherein both $R^2$ and $R^3$ independently represent an alkyl group having from 1 to 6 carbon atoms with at least one OH group substituent.

7. The method according to claim 1, wherein $R^1$ represents a saturated alkyl group having from 11 to 15 carbon atoms.

8. The method according to claim 1, wherein $R^1$ represents a saturated alkyl group having from 11 to 13 carbon atoms.

9. The method according to claim 1, wherein the saturated fatty acid amide comprises a mixture of saturated fatty acid alkanolamides and dialkanolamides derived from technical mixtures of lauric and myristic acids or their esters.

10. The method according to claim 3, wherein the saturated fatty acid amide comprises a mixture of saturated fatty acid alkanolamides and dialkanolamides derived from technical mixtures of lauric and myristic acids or their esters.

11. The method according to claim 1, wherein the combined polyolefin-based material, saturated fatty acid amide and transition metal compound is molded by extrusion, wherein cooling is carried out at a temperature rate of up to 50° C. in from 0.1 to 5.0 seconds.

12. The method according to claim 1, wherein the transition metal compound comprises a metal selected from the group consisting of Co, Zr, Fe, Pb, Mn, Ni, Cr, V, Ce, Ti and Sn.

13. The method according to claim 1, wherein the transition metal compound comprises a transition metal salt.

14. The method according to claim 1, wherein the transition metal compound is present in an amount of less than 5 ppm metal based on the one or more polyolefins.

15. The method according to claim 1, wherein the ratio by weight of the saturated fatty acid amide to the transition metal compound metal content is adjusted to a value of from 10:0.1 to 10:$10^{-7}$.

16. The method according to claim 1, further comprising subjecting the molded, combined polyolefin-based material, saturated fatty acid amide and transition metal compound to a corona or plasma treatment.

17. The method according to claim 1, wherein the polyolefin-based material contains unsaturated fatty acid amides in an amount not greater than 10% by weight based on the saturated fatty acid amide.

18. The method according to claim 3, wherein the polyolefin-based material contains unsaturated fatty acid amides in an amount not greater than 10% by weight based on the saturated fatty acid amide.

19. The method according to claim 9, wherein the polyolefin-based material contains unsaturated fatty acid amides in an amount not greater than 10% by weight based on the saturated fatty acid amide.

20. A process for producing bonded and/or coated polyolefin-based moldings, fibers and films, said process comprising:
   (a) providing a molded polyolefin-based material prepared by the method according to claim 1; and
   (b) contacting a surface of the molded polyolefin-based material with a composition selected from the group consisting of adhesives and coatings.

21. A method of preparing molded polyolefin-based materials with improved adhesive/coating compatibility, said method comprising:
   (a) providing a polyolefin-based material to be molded, said material comprising one or more polyolefins;
   (b) combining the polyolefin-based material with from 0.01 to 20% by weight of a saturated fatty acid amide, based upon a total weight of the one or more polyolefins, and a transition metal compound in an amount of from 0.01 to 1000 ppm metal based on the one or more polyolefins; and
   (c) subjecting the combined polyolefin-based material, saturated fatty acid amide and transition metal compound to a molding procedure;
   wherein the saturated fatty acid amide corresponds to general formula (I):

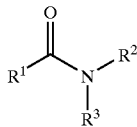
(I)

wherein $R^1$ represents a saturated alkyl group having from 5 to 21 carbon atoms; wherein $R^2$ and $R^3$ each independently represents hydrogen or an alkyl group having from 1 to 18 carbon atoms, the alkyl group having up to six substituents selected from the group consisting of OH groups, $NH_2$ groups, and $C_{1-10}$ alkyl groups, and wherein up to three non-adjacent carbon atoms in the alkyl group have been substituted with oxygen ether linkages; with the proviso that not both of $R^2$ and $R^3$ are hydrogen;

and wherein the combined polyolefin-based material, saturated fatty acid amide and transition metal compound contain unsaturated fatty acid amides in an amount not greater than 40% by weight based on the saturated fatty acid amide.

22. A method of preparing molded polyolefin-based materials with improved adhesive/coating compatibility, said method comprising:
   (a) providing a polyolefin-based material to be molded, said material comprising one or more polyethylenes, from 0.01 to 20% by weight of a saturated fatty acid amide, based upon a total weight of the one or more polyethylenes, and a transition metal salt in an amount of from 0.01 to 5 ppm metal based on the one or more polyolefins, wherein the transition metal salt comprises a metal selected from the group consisting of Co, Zr, Fe, Pb, Mn, Ni, Cr, V, Ce, Ti and Sn; and
   (b) subjecting the polyolefin-based material to a molding procedure;
   wherein the saturated fatty acid amide corresponds to general formula (I):

wherein $R^1$ represents a saturated alkyl group having from 11 to 13 carbon atoms; wherein $R^2$ and $R^3$ each independently represents hydrogen or an alkyl group having from 1 to 6 carbon atoms, the alkyl group having up to six substituents selected from the group consisting of OH groups, $NH_2$ groups, and $C_{1-10}$ alkyl groups, and wherein up to three non-adjacent carbon atoms in the alkyl group have been substituted with oxygen ether linkages; with the proviso that not both of $R^2$ and $R^3$ are hydrogen, and at least one of $R^2$ and $R^3$ represents an alkyl group having from 1 to 6 carbon atoms with at least one OH group substituent;
   and wherein the polyolefin-based material contains unsaturated fatty acid amides in an amount not greater than 10% by weight based on the saturated fatty acid amide.

* * * * *